US008782136B1

(12) United States Patent
Ho et al.

(10) Patent No.: US 8,782,136 B1
(45) Date of Patent: Jul. 15, 2014

(54) SYSTEM AND METHOD FOR PROVIDING ACCESS TO DATA OBJECTS BASED ON PROXIMITY

(75) Inventors: Ronald Ho, Fremont, CA (US); Wilfred Yeung, Somerset, NJ (US)

(73) Assignee: Google Inc., Mountain View, CA (US)

( * ) Notice: Subject to any disclaimer, the term of this patent is extended or adjusted under 35 U.S.C. 154(b) by 342 days.

(21) Appl. No.: 13/099,741

(22) Filed: May 3, 2011

Related U.S. Application Data

(60) Provisional application No. 61/468,197, filed on Mar. 28, 2011, provisional application No. 61/468,331, filed on Mar. 28, 2011.

(51) Int. Cl.
*G06F 15/16* (2006.01)

(52) U.S. Cl.
USPC .......................................... 709/204; 709/218

(58) Field of Classification Search
CPC ... H04L 67/02; H04L 67/104; H04L 67/1065; H04L 67/1048; H04L 67/1091; H04L 67/1095; H04L 67/2861; H04L 65/403; H04L 12/1827; G06Q 10/02; G06Q 10/1093; G06Q 20/352; G06Q 30/06; G06Q 30/0601; G06Q 50/12; G06Q 20/3224; G06Q 20/405; G06Q 30/0631
USPC ......... 709/204, 203, 205, 206, 207, 217–219, 709/223–226, 227–229
See application file for complete search history.

(56) References Cited

U.S. PATENT DOCUMENTS

| | | | |
|---|---|---|---|
| 2005/0138576 A1* | 6/2005 | Baumert et al. | 715/862 |
| 2006/0203758 A1* | 9/2006 | Tee et al. | 370/315 |
| 2008/0085682 A1* | 4/2008 | Rao | 455/74 |
| 2009/0201896 A1* | 8/2009 | Davis et al. | 370/338 |
| 2010/0002122 A1* | 1/2010 | Larson et al. | 348/333.01 |
| 2010/0268779 A1* | 10/2010 | Rao | 709/206 |
| 2011/0047237 A1* | 2/2011 | Walsh et al. | 709/207 |
| 2011/0319016 A1* | 12/2011 | Gormley et al. | 455/41.1 |

OTHER PUBLICATIONS

"Color Photo-Sharing App Takes Social Networking to an Amazing, Terrifying New Place" [online]. Retrieved from the Internet: <http://www.digitaltrends.com/social-media/color-photo-sharing-app-takes-social-networking>, Mar. 24, 2011, 6 pages.

* cited by examiner

*Primary Examiner* — Ruolei Zong
(74) *Attorney, Agent, or Firm* — Ropes & Gray LLP

(57) ABSTRACT

A system and method for providing access to data objects based on proximity. The system and method allow sharing of data objects by identifying one or more client devices proximate to the sharing device. The user of the sharing device may then select one or more of the identified devices with which to share the data object. Aspects of the invention include the ability to enable a "sharing mode" on the client devices to opt-in and allow communication with other similarly configured devices in the area. Access to the data object may be managed via an access control list present on a remote server, with the remote server hosting the data object.

22 Claims, 4 Drawing Sheets

SYSTEM AND METHOD FOR PROVIDING ACCESS TO DATA OBJECTS BASED ON PROXIMITY

CROSS-REFERENCE TO RELATED APPLICATIONS

The present application claims priority from Provisional Applications 61/468,197 and 61/468,331 filed Mar. 28, 2011, the disclosure of which is hereby incorporated by reference in their entirety.

BACKGROUND

Inexpensive access to remote storage and broadband networking has shifted data storage paradigms from a focus on portable media (e.g. diskettes, compact discs, portable harddrives, etc.) to a network-based model. So-called "cloud" storage allows a user access to their data from any terminal or device that is connected to the Internet. By storing data remotely, enterprise level service may be provided along with consumer level ease of use. Storing data in this manner also eliminates the risk of losing or damaging storage media containing important data.

However, remote storage of data also has limitations. Sharing of data objects is often difficult, as the data objects are typically associated with a particular user. In order to share a remotely stored data object, the object owner must convert the data object to a traditional form of media (i.e. portable media) and physically give the data to the target users, individually disseminate the information by sending the data to the target users electronically, such as via e-mail, or manually edit the permissions for the data object stored remotely to allow the target users to access the file. If the object owner wishes to share the data object with many different users, but not the entire public, such a process is time consuming and error-prone.

BRIEF SUMMARY

A method and system for providing access to data objects based to proximity is described. The method and system allow access to remotely stored data objects via a variety of different access criteria associated with proximity to a particular user or location. A first client device may recognize one or more proximate second client devices. The first client device then allows for selection of one or more of the second client devices with which to share a data object. The data object is then shared with the second devices, in some instances via enabling access to a data object stored on a remote server.

Aspects of the present invention are directed to a method and system for providing access to one or more data objects. In one aspect, the method comprises selecting a data object using a client device, identifying one or more second client devices proximate to the first client device using the first client device, selecting at least one of the second client devices with which to share the object using the first client device, and sharing the data object with the selected second client devices. In some aspects, the data object is stored on a remote server and shared with the at least one second client device by modifying an access control list associated with the data object. The second client devices may be identified by receiving a location of the one or more second client devices over a network, such as a Bluetooth network, a wireless network, or a mobile network.

In some aspects, the second client devices are identified as within a specified radius of the first client device. The method may further comprise enabling a sharing mode on the first client device. The one or more second client devices may be identified by a sharing mode being enabled on the one or more second client devices. The method may further comprise filtering one or more second client devices by the type of identification method by which the second client device was identified. In one aspect, the method may filter client devices identified over a Bluetooth network, devices present on the same Wi-Fi network, devices on the same mobile network, present at the same calendar event, proximate to a particular location, or proximate to the user. In a further aspect, the method may further comprise interfacing with at least one of a social networking system or a location services system to identify the one or more second client devices.

In another aspect, the method comprises a processing system for providing access to one or more data objects. The processing system comprises at least one processor coupled to a memory, and a sharing module. The memory stores one or more data objects and an access control list for the one or more data objects. The access list comprises at least one of the proximate client devices, and an identification of at least one data object. The sharing module is configured to determine one or more proximate client devices to a first client device, to receive an access list from the first client device, to identify one of the data objects, and to add the at least one proximate client device to the access control list for the identified data object. In some aspects, the sharing module is further configured to send a device list comprising the one or more proximate client devices to the first client device. The sharing module may be configured to interface with a social network system to identify the one or more proximate client devices. The sharing module may also interface with a location services system to receive the geographic location of at least one of the first client device or the one or more proximate client devices.

In yet another aspect, the system comprises a non-transitory computer-readable storage medium comprising instructions that, when executed by a processor, cause the process to perform a method. This method comprises the steps of selecting of a data object using a client device, identifying one or more second client devices proximate to the first client device, and selecting at least one of the second client devices. The data object is shared with the selected second client devices. In another aspect, the data object is stored on a remote server and shared with at least one second client device by modifying an access control list associated with the data object. In some aspects, the second client devices are identified by receiving a location of the second client devices, finding the second client devices on a Bluetooth network, or finding the second client devices on mobile network. In some aspects, the method may include identifying one or more second client devices within a specified radius of the first client device. In yet another aspect, the method further comprises enabling a sharing mode on the first client device. The one or more second client devices may be identified by the sharing mode enabled on the one or more second client device. For example, the method may further comprise filtering one or more second client devices by an identification method by which the one or more second client devices were identified.

Aspects of the invention may further include a non-transitory computer-readable storage medium comprising a method for providing access to one or more data objects. The method comprises receiving a set of data from a first client device, modifying an access control list associated with the data object, and providing to a second client device access to the identified data object. The set of data may comprise an identifier designating a data object and a second client device within a predefined proximity of the first client device.

DETAILED DESCRIPTION

A system and method for providing access to data objects based on proximity are described herein. Data objects are generally defined to be any data which may be shared among users. For example, the data objects may be audio files, video files, images, documents, executable files, data streams, or any other type of data that can be represented in electronic form. For situations in which the systems discussed here collect information about users, the users may be provided with an opportunity to opt in/out of programs or features that may collect personal information (e.g., information about a user's preferences or a user's contributions to social content providers). In addition, in some examples, certain data may be anonymized in one or more ways before it is stored or used, so that personally identifiable information can be removed. For example, a user's identity and location may be anonymized so that the personally identifiable information can not be determined or associated for the user and so that identified user preferences or user interactions are generalized (for example, generalized based on user demographics) rather than associated with a particular user. Aspects of the invention which rely on a user location may identify the location in a general manner. For example, the system may provide information in a binary manner (e.g. a user is nearby, or they are not nearby) rather than specifically identifying a proximity or location.

Figure 1:
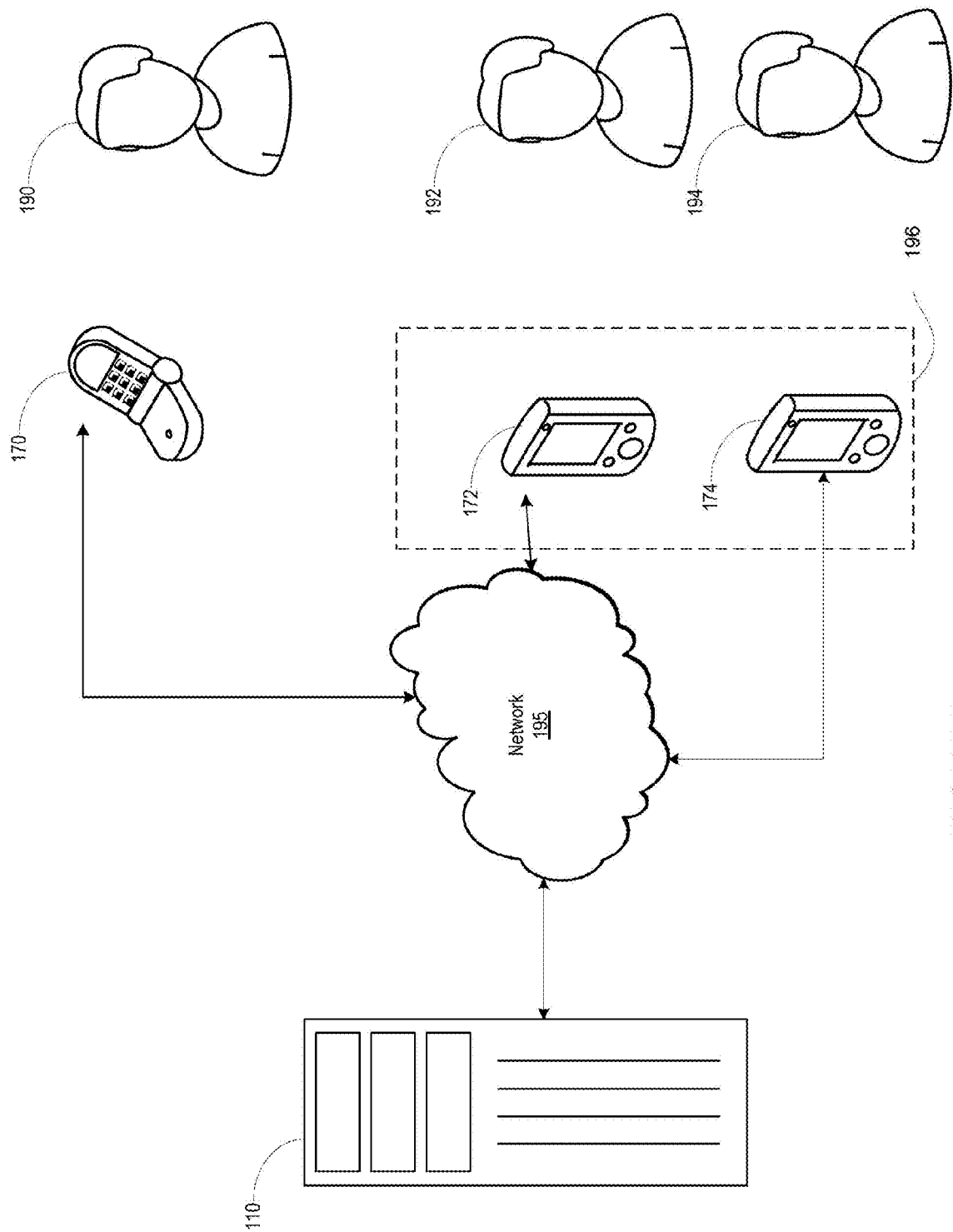
FIG. 1 is a system diagram in accordance with aspects of the invention.

As shown in FIG. 1, a system 100 includes a remote server 110 in communication with one or more client devices 170, 172, 174, and one or more users 190, 192, 194. The remote server 110 and the client devices 170, 172, 174 are coupled by a network 195.

The remote server 110 may host one or more data objects, providing access to the data objects by the client devices 170, 172, 174. As the host, the remote server 110 manages access control for the one or more data objects, and determines which of the client devices 170 may access each data object. The remote server 110 may be any type of server that handles management of data objects, such as a "cloud" backup service managing machine backups, an image gallery website managing images, a video website managing uploaded videos, a social networking website, and the like.

The system and method provide for sharing a data object with proximate users. For example, a user 194 of the client device 174 may wish to share a data object with a nearby user, such as user 192 of the client device 172. The client device 174 may enable a "sharing" mode to notify proximate client devices, including the client device 172, that it is available to share a data object. The client device 174 then determines whether any other client devices are in the nearby vicinity. In some aspects, identification of nearby devices is desirably provided using an "opt-in" system. For example, nearby devices are only displayed to the sharing client device if the user of the nearby device has elected to enter a sharing mode. In some aspects, the identity of a nearby device is only displayed if the user of the nearby device has elected to share with the particular sharing client device. Thus, according to the example, the client device 174 may determine that the client device 172 is within a predefined proximity. However, the client device 174 may not recognize the client device 170, because it is beyond the predefined proximity, or it may determine that the client device 170 is not within a preferred "sharing range." An identification of any nearby other client devices may then be presented to the client 174 via an interface, and the user 194 may select the other client devices with which the data object should be shared. The selected other client devices are then provided access to the data object as specified by the first client device. This access may be provided by enabling access permissions to a data object stored on a remote server.

The client devices 172 and 174 are depicted proximate to one another by the proximity rectangle 196. The proximity rectangle 196 indicates that the two client devices 172 and 174 are proximate to one another such that each would be configurable to share data objects with one another. The proximity rectangle 196 may indicate the two devices 172 and 174 are each within a particular radius of a geographic location, such as within 10 feet of the location, within 25 feet, within 100 yards, or within a mile. The proximity rectangle 196 may also indicate that the devices 172 and 174 are within a particular distance of one another, on the same Bluetooth or wireless network, or that both are scheduled to attend the same calendar event.

Figure 2:
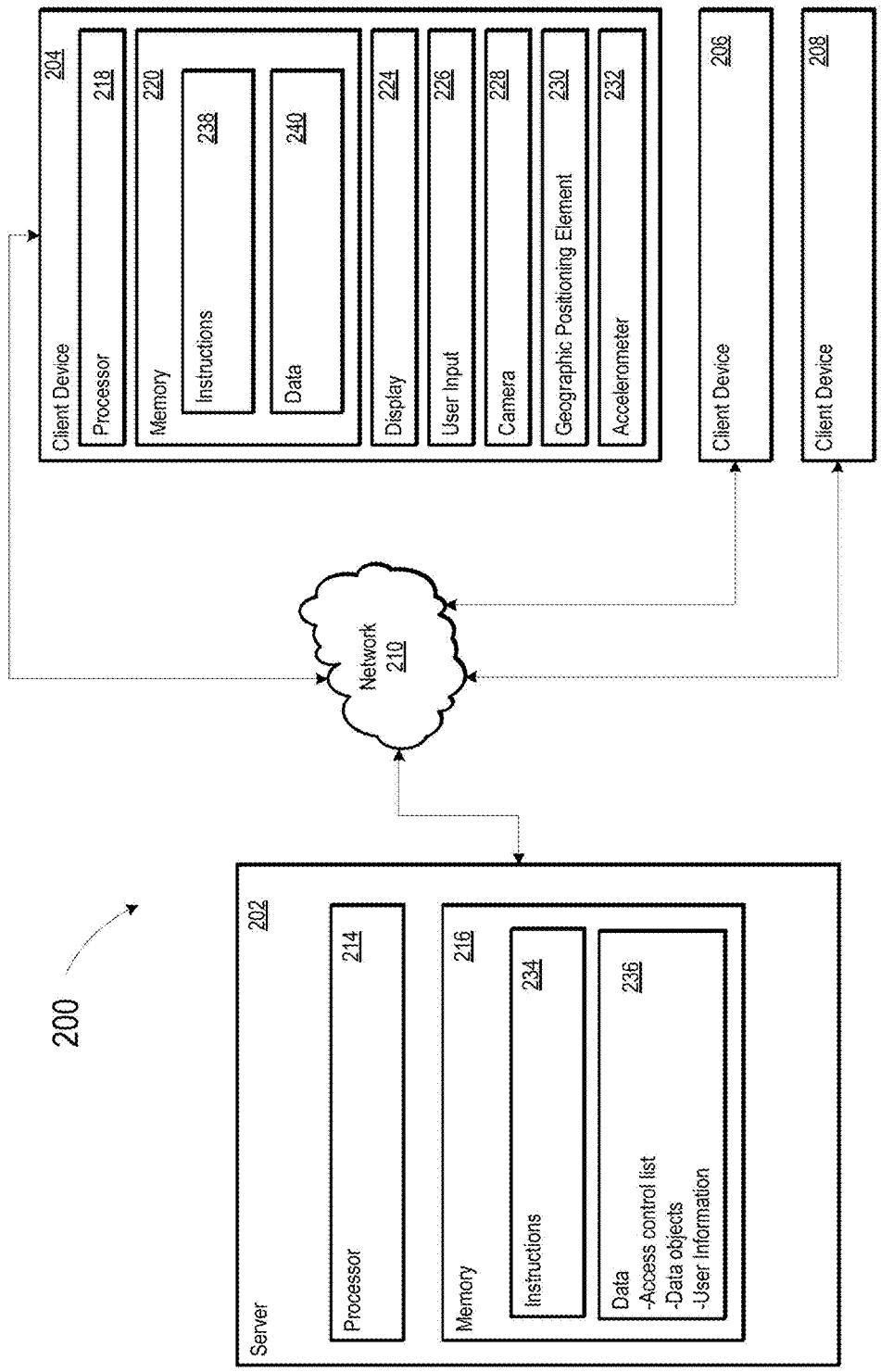
FIG. 2 is a block system diagram in accordance with aspects of the invention.

FIG. 2 is a block system diagram of a system 200 for providing access to data objects. The system comprises a remote server 202 and one or more client devices 204, 206, 208. While individual client devices may be referred to using a single reference numeral, it should be understood that aspects of each client device 204, 206, or 208 are also attributable to the other client devices described herein. The remote server 202 may include a processor 214, memory 216 and other components typically present in general purpose computers.

Memory 216 may store information that is accessible by the processor 214, including instructions 234 that may be executed by the processor 214 and data 236. The memory 216 may be of any type of memory operative to store information accessible by the processor 214, including a computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The system and method may include different combinations of the foregoing, whereby different portions of the instructions 234 and data 236 are stored on different types of media.

The instructions 234 may be any set of instructions to be executed directly (such as machine code) or indirectly (such as scripts) by the processor 214. For example, the instructions 234 may be stored as computer code on the computer-readable medium. In that regard, the terms "instructions" and "programs" may be used interchangeably herein. The instructions 234 may be stored in object code format for direct processing by the processor 214, or in any other computer language including scripts or collections of independent source code modules that are interpreted on demand or compiled in advance. Functions, methods and routines of the instructions are explained in more detail below (See FIG. 3). The instructions 234 may further comprise a sharing module for enabling the sharing of data objects with other users. In some aspects, the sharing module may be implemented as hardware, software, an Application Specific Interface Circuit (ASIC), a Field Programmable Gate Array (FPGA), or some combination thereof.

Data 236 may be retrieved, stored or modified by the processor 214 in accordance with the instructions 234. For instance, although the architecture is not limited by any particular data structure, the data may be stored in computer registers, in a relational database as a table having a plurality of different fields and records, Extensible Markup Language ("XML") documents or flat files. The data may also be formatted in any computer readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The remote server 202 may also store a set of data objects within the data 236. The data objects may be any type of data, such as documents, audio files, images, folders, albums, playlists, galleries or any other type of data that may be stored in an electronic format. The remote server 202 manages access to the data objects for one or more users. Information about the users is also stored within the data 236 as a set of user information. The set of user information may comprise various account credentials and descriptors necessary to provide user access to the remote server 202.

The remote server 202 may also maintain an access control list for the set of data objects. The access control list determines which users may have access to which data objects. The access control list may specify permissions at an individual user level, a group level, a public level, any other combination of access levels. Common examples of permissions include, but are not limited to, read permissions, write permissions, execution permissions, commenting permissions, appending permissions (e.g. the ability to add to a spreadsheet), and limited access permissions (e.g. a user may open a document 10 times, or share with up to 10 other users). Although the methods for managing access as described herein are generally described with respect to granting access based on proximity, the same methods could be applied to revoking or altering access based on the same or similar criteria.

The processor 214 may be any well-known processor, such as processors from Intel Corporation or AMD. Alternatively, the processor may be a dedicated controller such as an application-specific integrated circuit ("ASIC").

Although FIG. 2 functionally illustrates the processor and memory each within a single block, respectively, it will be understood that the processor 214 and memory 216 may actually comprise multiple processors and memories that may or may not be stored within the same physical housing. Accordingly, references to a processor, computer or memory will be understood to include references to a collection of processors, computers or memories that may or may not operate in parallel.

The remote server 202 may be at one node of a network 210 and be operative to directly and indirectly communicate with other nodes of the network. For example, the remote server 202 may comprise a web server that is operative to communicate with the client devices 204, 206, 208 via the network 210 such that the remote server 202 uses the network 210 to transmit and display information to the user, such as the user 190, 192, or 194, on a display 224 of the client device 204. The remote server 202 may also comprise a plurality of computers that exchange information with different nodes of a network for the purpose of receiving, processing and transmitting data to the client devices; in this instance, the client devices 204, 206, 208 may be at different nodes of the network than any of the computers comprising the remote server 202.

The network 210, and the intervening nodes between the remote server 202 and the client devices 204, 206, 208, may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, hypertext transfer protocol ("HTTP") and simple mail transfer protocol ("SMTP"), and various combinations of the foregoing. Although only a few devices are depicted in FIGS. 1 and 2, it should be appreciated that a typical system may include a large number of connected computers.

Each client device 210, 206, 208 may be configured similarly to the remote server 202, with a processor 218 and memory 220. As described with respect to the remote server 202, the memory 220 may comprise a set of instructions 238 and a set of data 240. The processor 218 executes the instructions 238 to control operation of the client device 204. For example, each client device 204 may be a mobile phone operative to wirelessly exchange data with a server over a network such as the Internet and intended for use by a user such as the users 190, 192, 194. The client device may also comprise a personal computer, personal digital assistant ("PDA"), tablet PC, netbook, etc. In this regard, the display 224 may also comprise a monitor having a screen, a projector, a television, a computer printer or any other electrical device that is operable to display information. The client device 204 may have all of the components normally used in connection with a wireless mobile device such as a central processing unit (CPU), memory (e.g., RAM and ROM) storing data and instructions, an electronic display 224 (e.g., a liquid crystal display ("LCD") screen or touch-screen), user input 226 (e.g., a keyboard, touch-screen or microphone), camera 264, a speaker, a network interface component, and all of the components used for connecting these elements to one another. Some or all of these components may all be internally stored within the same housing, e.g. a housing defined by a plastic shell and LCD screen.

The client devices 204, 206, 208 may also include a geographic positioning element 230, such as circuits, to determine the geographic location and orientation of the device. For example, client device 204 may include a Global Positioning System ("GPS") receiver that may determine the latitude, longitude and altitude of the client device 204. The geographic positioning element 230 may also comprise software operative to determine the position of the device based on other signals received at the client device 204. As specific, non-limiting examples, these other signals may comprise signals received from one or more cell phone towers where the client device 204 includes a cell phone, signals received from local Wi-Fi access points, and the like.

The system and method may process locations expressed in different ways, such as latitude/longitude positions, street addresses, street intersections, an x-y coordinate with respect to the edges of a map (such as a pixel position when a user clicks on a map), names of buildings and landmarks, and other information in other reference systems that is operative to identify a geographic location (e.g., lot and block numbers on survey maps). Moreover, a location may define a range of the foregoing.

The system and method may further translate locations from one reference system to another. For example, the remote server 202 may access a geocoder to convert a location identified in accordance with one reference system (e.g., a street address such as "1600 Amphitheatre Parkway, Mountain View, Calif.") into a location identified in accordance with another reference system (e.g., a latitude/longitude coordinate such as (37.423021°, −122.083939)). In that regard, it will be understood that exchanging or processing locations expressed in one reference system, such as street addresses, may also be received or processed in other references systems as well.

A location for the user device may be defined in different ways. By way of example, GPS receivers are not always accurate and may return a different latitude/longitude within a certain tolerance even if the user did not move. In other words, the latitude/longitude returned by a receiver may be considered accurate within a certain distance, and that distance may be considered to define a circle around a given latitude/longitude location. For example, the latitude/longitude may be accurate within a distance of 10 feet, 10 yards, 25 yards, or 100 yards. In some embodiments, a user is considered to be stationary if the latitude/longitude locations returned by the GPS receiver falls within that circle. As described above, a location of a client device may be anonymized prior to transmittal from the client device, such as by only referring to a general area, or by applying a hash function prior to transmittal.

The client device 204 may also include an accelerometer 232 and/or gyroscope to determine the orientation of the device. By way of example only, the client device 204 may determine its pitch, yaw or roll (or changes thereto) relative to the direction of gravity or a plane perpendicular thereto. In that regard, it will be understood that the client device 204 may automatically provide location and orientation data to the user 190, 192, 194, to the remote server 202, or both.

The user input 226 may also include other components such as a mouse. Indeed, devices in accordance with the systems and methods described herein may comprise any device operative to process instructions and transmit data to and from humans and other computers including general purpose computers, network computers lacking local storage capability, etc.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system. Further, the functions described herein may be performed across multiple processes in a distributed processing environment.

Although some functions are indicated as taking place on the remote server 202 and other functions are indicated as taking place on the client devices 204, various aspects of the system and method may be implemented by a single computer having a single processor. It should be appreciated that aspects of the system and method described with respect to the client may be implemented on the server, and vice-versa.

The remote server 202 and client devices 204 may store additional data, such as client information, user information, data objects, data object metadata, data object access criteria, and the like, as described herein. By way of example, the user may enable his or her client device 204 to transmit the client device's location to the server. The transmission may occur, for instance, when the user attempts to access a data object for which the user's presence at a particular location enables access.

The client device 204 facilitates sharing of the one or more data objects managed by the remote server 202 by sending and receiving information to and from the remote server 202. According to some aspects, the client device 204 executes an application specifically designed for managing access to the data objects.

As described above, the system desirably provides privacy protections for the client data including, for example, anonymization of personally identifiable information, aggregation of data, filtering of sensitive information, encryption, hashing or filtering of sensitive information to remove personal attributes, time limitations on storage of information, and/or limitations on data use or sharing. Preferably, data is anonymized and aggregated such that individual client data is not revealed.

The methods below describe computer-implemented methods performed by devices, such as the remote server 202 and the client device 204. These methods generally describe functions that may be performed by a computer processor or processors programmed by software, firmware, or other instructions. Aspects of the methods are generally interchangeable between the remote server and the client device.

Figure 3:
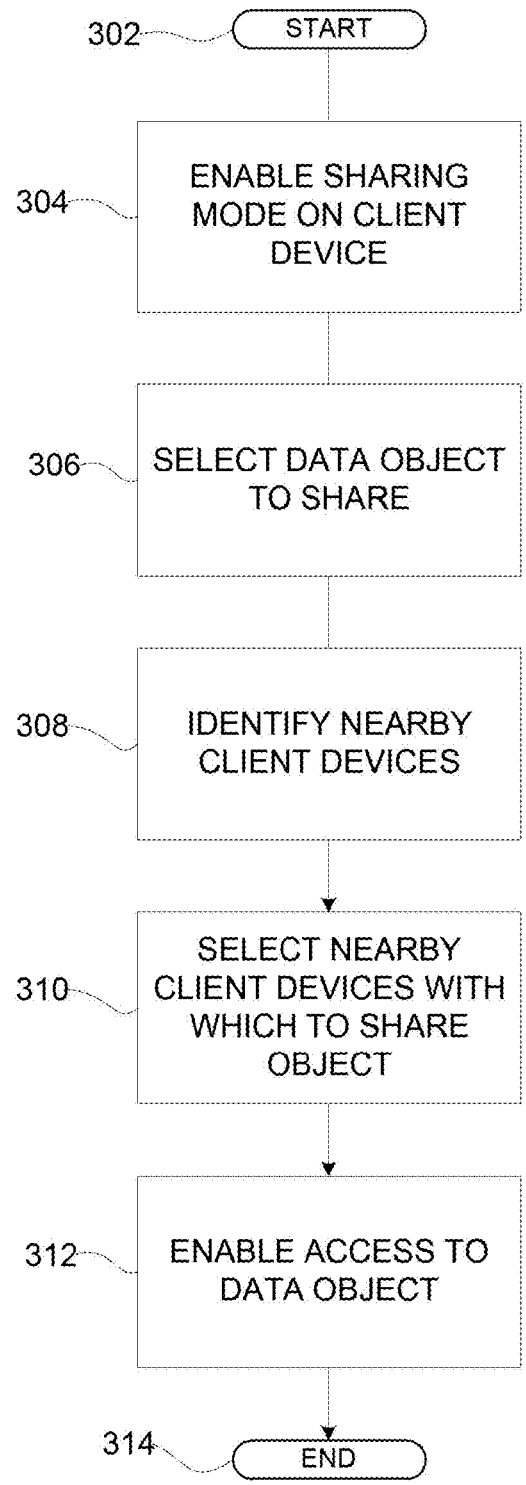
FIG. 3 is a flow diagram depicting an embodiment of a method for enabling access to a data object in accordance with aspects of the invention.

FIG. 3 is a flow diagram depicting a method 300 for providing access to one or more data objects to one or more proximate client devices in accordance with aspects of the present invention. The method 300 may represent one embodiment of the instructions 238 for controlling execution of the processor of the client device 204 described with respect to FIGS. 1 and 2.

While the methods described herein are described with respect to a client device in communication with a remote server, it should be appreciated that aspects of the invention may be implemented with respect to data objects stored locally on a client device as well, without the need for the intermediary provided by a remote server. Furthermore, while the method 300 is described as executing on a client device such as the client device 204, aspects of the method might also or instead be executed by the server 202 or on other computing nodes.

At step 304, a sharing mode is enabled on one or more client devices. The sharing mode may enable the client device to communicate with other similarly configured client devices in a nearby area. For example, the client devices may communicate by Bluetooth, over a wireless network such as provided by 802.11x protocols, via infrared, cellular, or any other signals for communicating with proximate devices as known in the art. The enablement of a sharing mode may cause the client device to broadcast a notification to other client devices in the area that it is available to share data objects. For example, a user may be visiting extended family for the holidays. The user may have family photographs stored either locally on his or her client device, such as a smart phone or camera, or remotely on a server, such as via a social networking site. The user may desire to share these photographs with others in the immediate area. To do so, the user would first enable sharing mode on their smart phone, which would enable the smart phone to broadcast to other similarly configured client devices in the area. It should also be appreciated that the client device may operate in sharing mode by default, without the requirement for the user to manually enable the mode. In some aspects, the ability to enter sharing mode is provided by an application executing on the client device. In some aspects, the ability to engage sharing mode may be provided as basic functionality of the client device. The method proceeds to step 306 after sharing mode is enabled.

At step 306, the client device 204 selects a data object to be shared. For example, the client device 204 may present the user with a user interface in response to sharing mode being enabled. The interface may allow the user to select one or more data objects to share with other users or client devices. As described above, the identity of other local devices may be anonymized and provided via an opt-in process, allowing other users to specifically indicate they wish to be listed as available for sharing. The user may also select data objects to be shared by default, without requiring the user to manually select data objects to be shared each time sharing mode is enabled. For example, the user at the family gathering may select particular photographs stored locally or remotely to share with the other proximate users. After selecting the data objects, the method 300 proceeds to step 308.

At step 308, the client device 204 identifies proximate client devices that are equipped to receive access to the selected data objects. The client device 204 may determine whether a given client device is proximate in a variety of manners, including but not limited to identifying other devices present on a short range network such as Bluetooth, identifying other devices on the same local wireless network, receiving GPS locations for client devices provided either locally or via a remote server, identifying other users that have accepted a calendar invitation, and the like. In some aspects, the proximate client devices are determined by a remote server and sent as a list to the first client device. In some aspects, the proximate client devices are determined by the first client device itself. For example, the client device may connect to a social networking site capable of reporting the locations of friends of the user. The user may then receive a list of all friends within a particular radius of the user, such as 10 feet, 100 yards, 1 mile, and the like. As another example, the client device may identify all devices present on a short range network, such as Bluetooth, which are enabled for sharing as described above with respect to step 304. As yet another example, the client device may first identify the location of the user's client device using positioning technology present on the client device, then identify the location of friends of the user by location information reported by client devices in possession of the friends, and finally determine a distance between the user's location and the friend's location. In another example, the client device may identify nearby users by accessing a planning program to determine which users are scheduled to attend a particular event, such as all of those who received an invitation using a calendar system. The client device may also interface with other location based services programs, such as GOOGLE LATITUDE, 4SQUARE, and the like to identify users who have "checked in" as being located nearby.

To use the family gathering example, after selecting the photographs to share, the user may be presented with a list of client devices detected on the same wireless network. In some aspects, the user may be presented with a list of friends linked to a social networking site, rather than a list of client devices, as the client device may be capable of resolving a particular client device to a particular friend. As above, participation in such a service via a social networking site is desirably provided through an opt-in process. The method 300 then proceeds to step 310 after determining one or more client devices proximate to the user's client device.

At step 310, the user may select one or more proximate client devices with which to share the data object. For example, the list of proximate devices as determined at step 308 may be presented to the user via a user interface as a series of checkboxes, with each checkbox being associated with sharing the data object with a particular user. The user may select one or more of the proximate users from this list. To use the family gathering example again, the user may be presented with a list of all family members at the party who have eligible client devices. From this list, the user may select to send the photographs to Uncle Ronald and Grandpa Michael, but not the rest of the family. After selecting one or more users with which to share the data object, the method proceeds to step 312.

At step 312, the client device 204 enables access to the data object selected at step 306. In aspects where the data object is stored on a remote server, access may be enabled by adding the users and their client devices selected at step 308 to an access control list for the data object. Adding the users to the access control list may be accomplished by sending a list of approved users from the user's client device to the remote server. In aspects where the data object is stored on the local client device, the client device may transmit the data object to the selected client devices. In some aspects, the client devices receiving access to the data object may present an alert to the users, indicating they have had a data object shared. To return to the family gathering example, the first user's client device would send a list of approved users to the remote server. The remote server would then enable access to the photographs for the users identified by the first user. The identified users could then access the photographs, receiving an alert indicating the availability of the photos. After enabling access to the data object, the method 300 ends at step 314.

Figure 4:
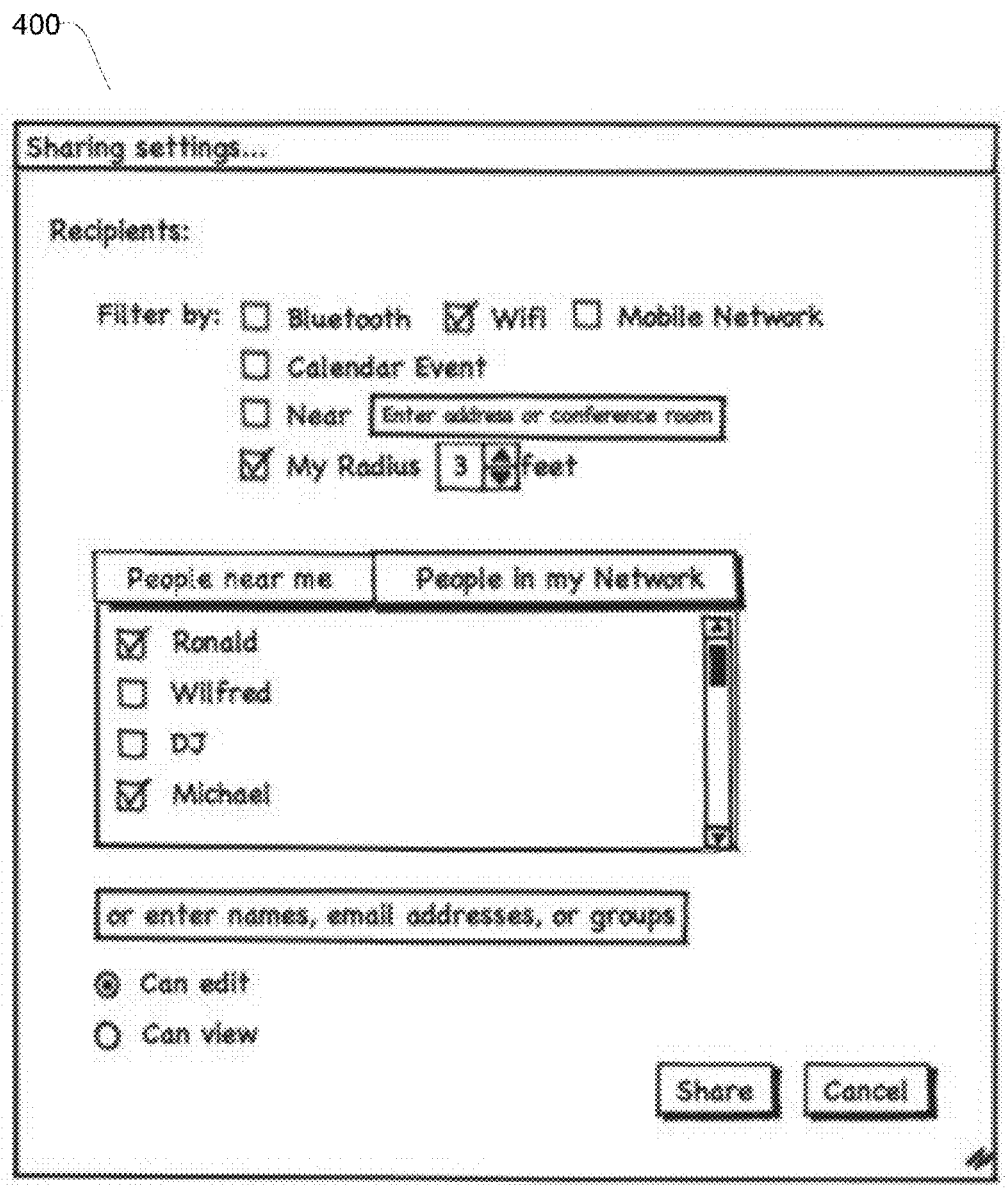
FIG. 4 is an illustration depicting an exemplary user interface for configuring access to a data object based upon proximity in accordance with aspects of the invention.

FIG. 4 is an illustration depicting an exemplary user interface 400 for configuring access to a data object for proximate client devices in accordance with aspects of the invention. For example, the interface 400 may be a graphical user interface (GUI) provided to a user via a display on a client device to modify the access criteria for a given data object or data objects. The illustration shows an interface window associated with a data object.

The interface 400 may present a list of criteria by which to identify proximate users with which to share the data object. For example, the interface 400 allows for filtering proximate users using Bluetooth, on the same Wi-Fi network, on the same mobile network, present at the same calendar event, proximate to a particular location, or proximate to the user. The interface 400 also allows for specification of a particular radius, such as 3 feet, 3 yards, or 3 miles, and specification of a particular address or location. Upon setting a filter, the interface 400 provides the user with a series of users/client devices with which to share the data object.

As described in the example with respect to FIG. 3, the interface window may include a series of checkboxes, with the sharing checkboxes selected for Ronald and Michael. As such, Ronald and Michael will receive access to the data object, while proximate users Wilfred and DJ will not. The interface 400 also allows for the specification of the type of access, such as editing and viewing privileges. Upon selection of users with which to share the object, the user may enable sharing of the data object with the selected users or client devices by selecting the "Share" button, or cancel by selecting the "Cancel" button.

The method and system as described herein advantageously provide for flexible and robust sharing of data objects with multiple users, including proximate users. Sharing data objects in this manner allows for users to share the data objects without the need to give away personal information such as telephone number or e-mail addresses. The streamlined interface allows for easy sharing of data objects among other nearby users without the need to type in multiple e-mail addresses or give out personal information.

As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible embodiments.

The invention claimed is:

1. A computer-implemented method for providing access to one or more data objects, the method comprising:
    selecting a data object using a first client device;
    interfacing with a social networking website to identify a plurality of second client devices proximate to the first client device using the first client device;
    selecting one of the plurality of second client devices with which to share the data object using the first client device;
    assigning permissions associated with the data object to the selected client device using an access control list associated with the data object, wherein the permissions comprise limited access permissions indicative of a predefined number of a plurality of other users to share the data object with; and
    sharing the data object with the selected client device, wherein data associated with the selected client device is filtered such that the data is anonymized.

2. The method of claim 1, wherein the data object is stored on a remote server.

3. The method of claim 1, wherein the plurality of second client devices are identified by at least one of receiving a location of the plurality of second client devices, finding the plurality of second client devices on a Bluetooth network, finding the plurality of second client devices on a wireless network, or finding the plurality of second client devices on a mobile network.

4. The method of claim 1, wherein the plurality of second client devices are within a specified radius of the first client device.

5. The method of claim 1, further comprising enabling a sharing mode on the first client device.

6. The method of claim 5, wherein the plurality of second client devices are identified by a sharing mode being enabled on the plurality of second client devices.

7. The method of claim 1, further comprising filtering the plurality of second client devices by a type of identification method by which the plurality of second client devices were identified.

8. The method of claim 7, wherein the type of identification method is at least one of detecting a second client device on the same Bluetooth network, on the same mobile network, on the same wireless network, present at the same calendar event, proximate to a particular location, or proximate to the user.

9. The method of claim 1, further comprising interfacing with a location services system to identify the plurality of second client devices.

10. The method of claim 1, wherein the limited access permissions are further indicative of a number of times a user device may open the data object and wherein the assigning permissions further comprises assigning the limited access permissions to the user device.

11. A processing system for providing access to one or more data objects, the processing system comprising:
    a processor;
    a memory for storing a plurality of data objects and an access control list associated with the plurality of data objects, the memory coupled to processor; and
    a sharing module stored in the memory and executed by the processor,
    wherein the sharing module is configured to:
        determine a plurality of proximate client devices to a first client device by interfacing with a social networking website;
        receive an access list from the first client device, the access list comprising one of the plurality of proximate client devices identified by the first client device;
        identify one of the plurality of data objects; and
        add the one proximate client device to the access control list for the identified data object, wherein the access control list comprises assigned permissions associated with the data object to the one proximate client device, and wherein the assigned permissions comprise limited access permissions indicative of a predefined number of a plurality of other users to share the data object with and wherein data associated with the one proximate client device is filtered such that the data is anonymized.

12. The processing system of claim 11, wherein the sharing module is further configured to send a device list comprising the plurality of proximate client devices to the first client device.

13. The processing system of claim 11, wherein the sharing module is further configured to interface with a location services system to identify the plurality of proximate client devices.

14. The processing system of claim 11, wherein the sharing module is further configured to interface with a location services system to receive the geographic location of at least one of the first client device or the plurality of proximate client devices.

15. A non-transitory computer-readable storage medium comprising instructions that, when executed by a processor cause the processor to perform a method comprising:
    selecting a data object using a first client device;
    interfacing with a social networking website to identify plurality of second client devices proximate to the first client device using the first client device;
    selecting one of the plurality of second client devices using the first client device;
    assigning permissions associated with the data object to the selected client device using an access control list associated with the data object, wherein the permissions comprise limited access permissions indicative of a predefined number of a plurality of other users to share the data object with; and sharing the data object with the selected client device, wherein data associated with the selected client device is filtered such that the data is anonymized.

16. The non-transitory computer-readable storage medium of claim 15, wherein the data object is stored on a remote server.

17. The non-transitory computer-readable storage medium of claim 15, wherein the plurality of second client devices are identified by at least one of receiving a location of the plurality of second client devices, finding the plurality of second client devices on a Bluetooth network, or finding the plurality of second client devices on a mobile network.

18. The non-transitory computer-readable storage medium of claim 15, wherein the plurality of second client devices are within a specified radius of the first client device.

19. The non-transitory computer-readable storage medium of claim 15, further comprising enabling a sharing mode on the first client device.

20. The non-transitory computer-readable storage medium of claim 18, wherein the plurality of second client devices are identified by a sharing mode being enabled on the plurality of second client devices.

21. The non-transitory computer-readable storage medium of claim 15, further comprising filtering the plurality of second client devices by an identification method by which the plurality of second client devices were identified.

22. A computer-implemented method for providing access to one or more data objects, the method comprising:
   receiving, using a processor, a set of data from a first client device, the set of data comprising an identifier designating a data object and a second client device within a predefined proximity of the first client device;
   modifying an access control list associated with the data object, wherein the access control list comprises assigned permissions associated with the data object, wherein the assigned permissions comprise limited access permissions indicative of a predefined number of a plurality of other users to share the data object with; and
   providing to the second client device access to the data object, wherein data associated with the second client device is filtered such that the data is anonymized.

* * * * *